July 8, 1952      G. W. GEORGE      2,602,264
FIGURE TOY WITH FOOD REPRESENTING RATTLE ELEMENTS
Filed May 10, 1948
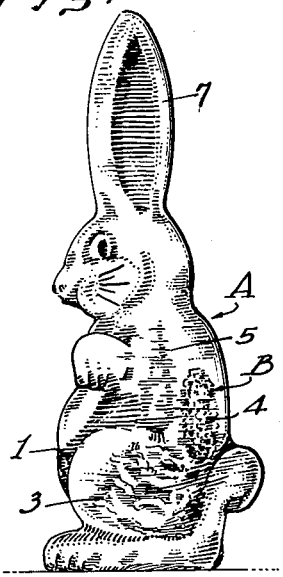
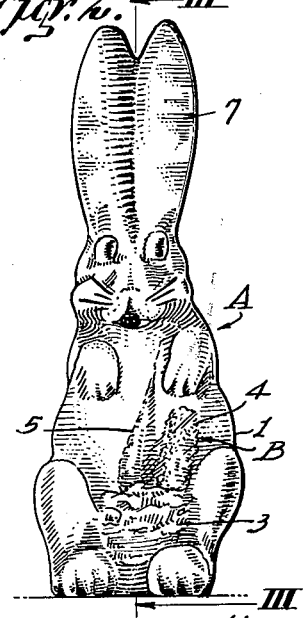
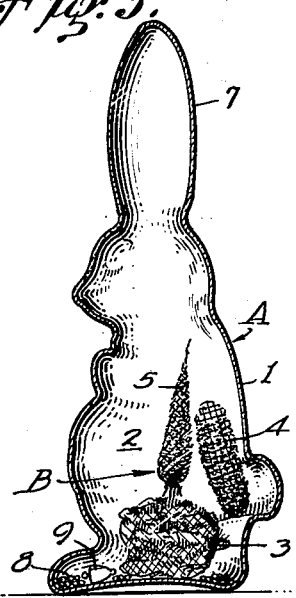
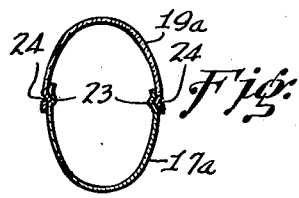
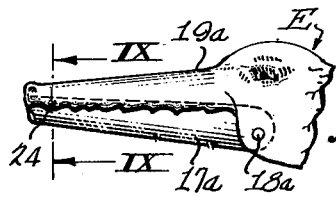
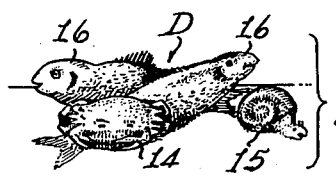
INVENTOR.
GEORGE W. GEORGE
BY Munn, Liddy & Glaccum
ATTORNEYS.

Patented July 8, 1952

2,602,264

UNITED STATES PATENT OFFICE 2,602,264

FIGURE TOY WITH FOOD REPRESENTING RATTLE ELEMENTS

George W. George, Santa Monica, Calif.

Application May 10, 1948, Serial No. 26,108

2 Claims. (Cl. 46—117)

The present invention relates to improvements in an educational toy with food-representing rattle elements. It consists of the combinations, constructions and arrangement of parts hereinafter described and claimed.

It is proposed in the present invention to provide an educational toy, which is designed to teach youngsters the articles of food which are normally eaten by a particular animal. The body of such an animal is made hollow, and an object is disposed therein, the object being shaped to represent food for the animal. The food-like object can be viewed by the youngster.

It is further proposed in this invention to construct the food-representing objects in such a manner that they will serve as rattle elements, thus adding to the entertainment and amusement values of the toy.

More specifically stated, I propose to teach youngsters the proper feeding of various foods to various animals. While the food-representing articles are disposed in the hollow body of an animal, they may be observed through a transparent portion of the body of the animal. The toy will instruct the youngster the accepted food a designated animal eats. For instance, the food for a bunny rabbit would consist of suitable objects made to represent lettuce, carrot, corn, etc. These objects could be entirely and permanently confined within the body of the rabbit so as to deny access thereto by infants.

It is further proposed to provide an educational toy of the feeder type, which is arranged in such a way that youngsters can actually feed the food-representing objects into the body of the toy and then observe the food contained in the abdomen of the animal-like toy. As previously stated, these objects serve as rattle elements when the animal is shaken.

Other objects and advantages will appear as the specification continues, and the novel features of the invention will be particularly set forth in the claims hereunto appended.

For a better understanding of my invention, reference should be had to the accompanying drawing, forming part of this application, in which:

Figure 1 is a side elevation of an amusement toy made in accordance with this invention and representing a bunny rabbit;

Figure 2 is a front elevational view of the same rabbit;

Figure 3 is a vertical sectional view taken through the toy along the line III—III of Figure 2;

Figure 4 is a utility view showing the rabbit-like toy being used as a rattle;

Figure 5 is a modified form of the rabbit toy, disclosing the body thereof colored and a transparent window provided in the abdomen to allow the food objects to be seen;

Figure 6 discloses a feeder-type toy, the general idea being embodied in an alligator;

Figure 7 is an assembly view of food objects suitable for feeding to the alligator;

Figure 8 illustrates an alternate means for holding the lower jaw of the alligator in closed position; and Figure 9 is an enlarged transverse sectional view taken along the line IX—IX of Figure 8.

While I have shown only the preferred forms of my invention, it should be understood that various changes, or modifications, may be made within the scope of the annexed claims without departing from the spirit thereof. In particular, I do not desire to be confined to the animals shown in the drawing, since the principle may be applied to many animals, or the like.

Referring now to Figures 1 to 4, inclusive, I have disclosed a bunny rabbit indicated generally at A. The body 1 of the rabbit is made in the nature of a shell having a hollow interior 2. Any suitable material may be used for this shell, such as plastic. The body may be entirely transparent, semi-transparent, or even opaque. In any event, however, at least a portion of the body must be transparent in order to allow food-representing objects B to be seen from the exterior of the rabbit, thus carrying out the general educational thought of the invention.

The objects B have been shown as a head of lettuce 3, an ear of corn 4, and a carrot 5. These objects are suitably colored to represent the actual products appropriate for feeding to a rabbit, and should have sufficient weight so that they will serve as rattle elements when the rabbit is shaken by a youngster, as suggested in Figure 4. In this particular view, the youngster's hand 6 is illustrated as grasping the ears 7 of the rabbit. A transparent portion of the body must be provided in order that the youngster can observe the food-representing objects in the abdomen of the rabbit.

The body 1 may be fashioned so as to entirely and permanently enclose the objects B, as suggested in Figures 1 to 4, inclusive. This will deny access to the objects by the infant. The body 1 may be formed of tinted plastic, if desired. In order to achieve a real rattle noise, the objects could be made out of lead, or some other metal, or might be made with a metal coating. Figure 3 further shows additional rattle elements confined in the body of the animal, such as shot 8 and a bell 9. Whatever food-representing objects are incorporated into the body should form the main rattle elements, but they should be made to achieve the loudest and most appropriate noise.

Figure 5 discloses the body 1a of a bunny rabbit as being fashioned from colored material and leaving a window 10 in the abdomen of the rabbit, which will allow the objects B to be viewed. This window may be merely a transparent portion of the rabbit body, or it may be hinged at 11 in such a manner that it can be opened for permitting the objects B to be inserted into the interior of the rabbit or removed therefrom. A catch 12 may be provided for securing the window in closed position. The youngster can open the window 10 and introduce the selected food-representing objects into the rabbit.

Turning now to Figure 6, I have therein disclosed an alligator C. The body 1b is made hollow and includes at least a transparent portion that will allow food-representing objects D to be observed in the abdomen of the alligator. These objects have been shown as representing a crab 14, snail 15, and fish 16, all suitable food for an alligator. These objects are made in appropriate colors and serve as rattle elements.

The lower jaw 17 of the alligator is hinged at 18 and may be opened relative to the upper jaw 19 to allow the objects to be fed into the alligator. For the purpose of holding the jaws 17 and 19 closed, I have shown a rubber band 20 encircling the jaws adjacent to the snout thereof. A snap ring or bail 21 may be hinged to one jaw, as at 22, so as to swing into position over the other jaw. However, I do not wish to be confined to these particular types of fastening means for the jaws. The snap ring 21 or the band 20 could be omitted, since either one or the other will suffice.

It will be noted from Figures 8 and 9 that I have disclosed the head portion E of an alligator. The remainder of this creature will be the same as in Figure 6. In Figures 8 and 9, the lower jaw 17a is pivoted at 18a so that it may be opened relative to the upper jaw 19a. The jaw 17a is provided with recesses 23 in opposing sides thereof, which are adapted to receive projections 24 formed on the jaw 19a. It will be understood that the projections 24 will snap into the recesses 23 for holding the jaws closed. When the jaws are opened, the food-representing objects can be introduced into the interior of the alligator or withdrawn therefrom.

All animals and food disclosed in the drawing are suggestions only. Any number of animals could be used—in fact the entire zoo is available, as well as humans. For instance, when the body of the animal is fashioned to represent a dog, the food-representing objects would be bones, steak, etc. When a bear is provided, the food objects would be honey combs, berries and fish. For an elephant, the food would be peanuts, leaves, etc. These various animals and foods are cited by way of illustrations only. In any case, however, the food could serve as rattle elements.

I claim:

1. In an educational toy: a hollow body formed to represent an animal; and an object loosely disposed within said body; the object being formed to represent an article of food normally eaten by that particular type of animal; at least a portion of said body being transparent so that the object can be viewed from the exterior of the body; the object having sufficient weight to serve as a rattle element, which will coact with said body to produce noise when said body is shaken.

2. In an educational toy: a hollow body formed to represent an animal; and an object loosely disposed within said body; the object being formed to represent an article of food normally eaten by that particular type of animal; at least a portion of said body being transparent so that the object can be viewed from the exterior of the body; said body having a section that may be opened to allow the object to be introduced into said body or removed therefrom; the object having sufficient weight to serve as a rattle element which will coact with the body to produce a noise when the body is shaken.

GEORGE W. GEORGE.

REFERENCES CITED

The following references are of record in the file of this patent:

UNITED STATES PATENTS

| Number | Name | Date |
|---|---|---|
| D. 11,293 | Hobbs | July 8, 1879 |
| D. 74,251 | Bettoli | Jan. 17, 1928 |
| 1,601,298 | Davis | Sept. 28, 1926 |
| 2,087,115 | Plochman | July 13, 1937 |